United States Patent [19]
Engelsberger

[11] 3,854,653
[45] Dec. 17, 1974

[54] VACUUM TIGHT PLASTIC SHEET ENVELOPE

[75] Inventor: Herbert Engelsberger, Viersen, Germany

[73] Assignee: Feldmuhle Anlagen-und Produktionsgesellschaft mit beschrankter Haftung, Dusseldorf-Oberkassel, Germany

[22] Filed: Nov. 8, 1973

[21] Appl. No.: 413,920

[30] Foreign Application Priority Data
Nov. 10, 1972 Germany............................ 2255026

[52] U.S. Cl. .................................. 229/51 R, 229/66
[51] Int. Cl. ....... B65d 5/54, B65d 5/70, B65d 17/00
[58] Field of Search ......... 229/51 R, 51 TS, 51 WB, 229/51 SC, 66, 43; 161/227, 271, 165

[56] References Cited
UNITED STATES PATENTS
| | | | |
|---|---|---|---|
| 3,454,210 | 7/1969 | Spiegel et al. ......................... | 229/43 |
| 3,511,436 | 5/1970 | Kessler.................................. | 229/66 |
| 3,625,351 | 12/1971 | Eisenberg .......................... | 229/66 X |
| 3,655,503 | 4/1972 | Stanley et al. ....................... | 161/165 |

*Primary Examiner*—Leonard D. Christian
*Attorney, Agent, or Firm*—Hans Berman

[57] ABSTRACT

A vacuum-tight, moisture impermeable envelope for food and the like consists of two laminar sheets or foils whose central portions bound a pocket and whose edge portions are sealed about the pocket by a weld integrally connecting the inner layers of the two sheets. Tearing lugs are constituted by respective parts of the two edge portions extending beyond the weld and movable relative to each other. The breaking strength and tear propagation resistance of the outer layer of one sheet are greater than the corresponding properties of the inner layer, and the latter is more brittle than the inner layer of the other sheet, both inner layers consisting of ethylene homo- or copolymers. The strength of the bond between the inner and outer layers of the one sheet is smaller than the breaking strength of the weld. This relationship of mechanical properties permits the sealed envelope to be opened conveniently.

6 Claims, 4 Drawing Figures

VACUUM TIGHT PLASTIC SHEET ENVELOPE

This invention relates to packaging, and particularly to vacuum tight envelopes of plastic foil or sheet material for food or the like, the terms foil and sheet being used herein interchangeably.

It is common practice to enclose food in an envelope constituted by two plastic sheets having edge portions welded to each other and to evacuate the pocket formed in the sheets before the weld is completed. No single plastic material presently available at tolerable cost meets the requirements for such use, and laminar foils or sheets are employed to provide necessary impermeability to gases and moisture combined with resistance to temperatures encountered during sterilization and freezing. The envelope should also have adequate mechanical strength to resist crushing and tearing in storage and handling. Furthermore, it needs to be suitable for heat sealing under conditions of mass production. Ultimately, it is also necessary that the sealed envelope be capable of being opened by the ultimate consumer without the use of tools.

Existing foil or sheet envelopes do not meet all such requirements equally well, and it was necessary heretofore to accept a compromise in which one or the other requirement was met in a less satisfactory manner in order to permit compliance with others.

The primary object of this invention is the provision of a plastic sheet envelope of the type described which compares favorably with all presently available, commercially practical envelopes in all the above-enumerated properties, and is superior to each known envelope in the combination of its properties.

With this object and others in view, this invention in its more specific aspects provides a vacuum-tight envelope mainly consisting of first and second laminar plastic sheets having each a central portion and an edge portion extending about the central portion in a closed loop. Each sheet has an outer layer and an inner layer bonded to the outer layer. The central sheet portions are spacedly superposed in such a manner that the inner layers of the central portions bound a pocket therebetween. The edge portions of the two sheets are contiguously superposed. An elongated weld integrally connects the inner layers of the edge portions in a closed loop sealing the pocket. Respective lug parts of the edge portions extend beyond the weld away from the pocket and are movable relative to each other. The breaking strength and tear propagation resistance of the outer layer in the first sheet are greater than the corresponding properties of the inner layer of the first sheet. Both inner layers consist of homo or copolymers of ethylene, the polymer in the inner layer of the first sheet being more brittle than the polymer in the inner layer of the second sheet. The strength of the bond between the inner and outer layers in the first sheet is smaller than the breaking strength of the weld.

Such an envelope provides adequate strength for handling and storage, and can be readily made vacuum-tight and capable of being sterilized by heat and refrigerated for freezing its contents while still being opened with minimal effort and without tools.

Other features, additional objects, and many of the attendant advantages of this invention will readily be appreciated as the same becomes better understood by reference to the following detailed description of a preferred embodiment and of modifications thereof when considered in connection with the appended drawing, in which.

Figure 1:
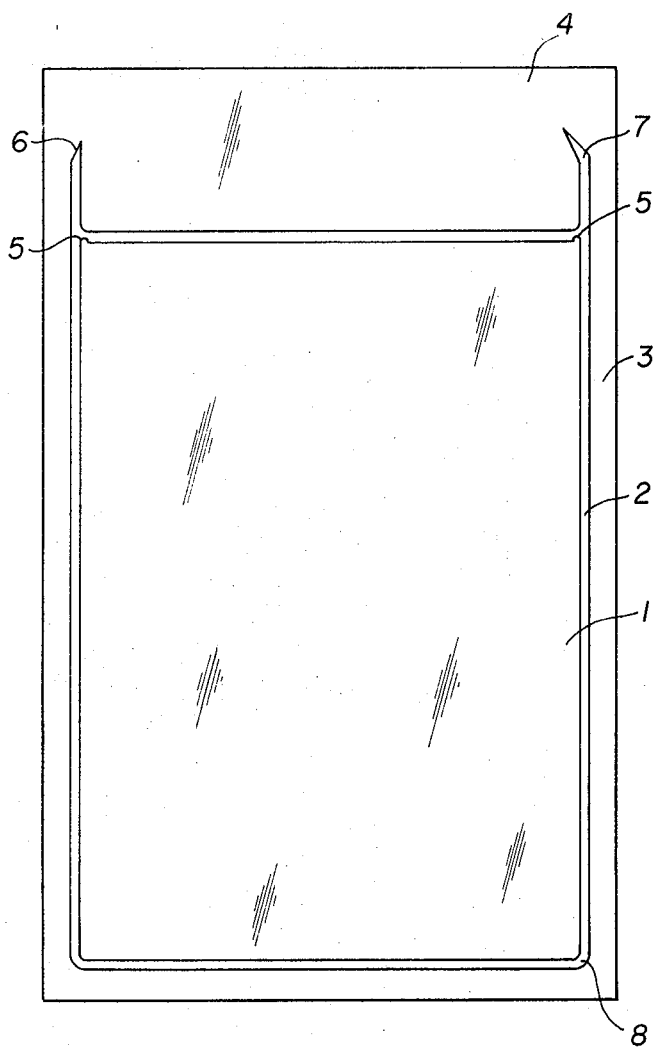
FIG. 1 is a top plan view of a sealed envelope of the invention.

Referring now to the drawing in detail, and initially to FIG. 1, there is seen an envelope of the invention consisting of two laminar plastic sheets coextensive and superposed so that only the top sheet is visible in FIG. 1.

Each sheet has a central portion 1 and an edge portion 3 extending about the central portion in a closed loop. The edge portions 3 are contiguously superimposed on each other and connected by a thermal seam or weld 2 which is elongated in an approximately rectangular closed loop. On one side of the rectangle the edge portions are wider to constitute tearing lugs 4.

Spurs 6, 7 extend from two corners of the loop 2 toward the tearing lugs 4, and portions 5 of the loop closely adjacent the spurs 6, 7 are of reduced width so as to be more frangible than other parts of the weld 2. The spur 6 is straight and longitudinally aligned with one long side of the rectangle formed by the weld, while the otherwise analogous spur 7 has a terminal part which is angularly offset toward the tearing lugs 4.

Figure 2:
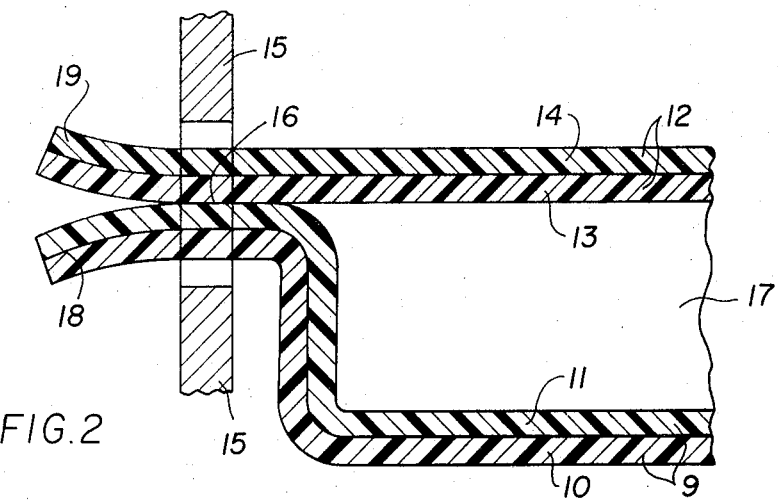
FIG. 2 shows the envelope of FIG. 1 and a heat sealing apparatus employed for welding the two sheets together in fragmentary elevational section on a larger scale than that of FIG. 1.

As is seen in FIG. 2, the two sheets 12, 9 have two layers each. The first or top sheet 12 is essentially planar and has an outer layer 14 of isotropic (unstretched) Nylon 6 which is strong and tough, particularly when absorbing some moisture from the ambient air. The inner layer 13 of the top sheet consists of high pressure polyethylene having a specific gravity of 0.928 to 0.940 which is relatively brittle and whose breaking strength and tear propagation resistance are smaller than the corresponding properties of the layer 14.

The second or bottom sheet 9 has the shape of a shallow cup or dish, and the central portions of the two sheets are spacedly superposed in such a manner that the two inner layers 13, 11 bound a pocket or cavity 17 which holds the food or other perishable material that it is desired to protect and which would normally be enclosed in the sealed envelope.

The inner layer 11 of the bottom sheet consists of high pressure polyethylene having a specific gravity of 0.918 to 0.924 and is tougher than the relatively brittle layer 13. The material of the inner layer 11 lends itself readily to the vacuum molding process by which the bottom sheet 9 is formed prior to assembly with the top sheet 12. The outer layer 10 of the bottom sheet 9 consists of the same Nylon 6 as the outer layer 14.

FIG. 2 shows the envelope immediately after forming of the weld portion 16 between the two inner layers 13, 11 by means of two electrodes 15 of conventional heat sealing apparatus, not in itself relevant to this invention. The aforementioned lug parts 4 consist of respective parts 19, 18 of the two sheets 12, 9 which extend beyond the weld 16 away from the pocket 17. These freely movable parts are of sufficient size that they be grasped manually.

When the two lug parts 18, 19 are pulled apart, the relatively brittle inner layer 13 fails because its breaking strength and tear propagation resistance are lower than the corresponding properties of the associated outer layer 14, and the relatively weak bond between the layers 13, 14 also must yield to permit tearing of the inner layer 13. The break then is propagated in the inner layer 13. The weld 2 is broken at its narrow, frangible portions 5, and the entire central portion 1 of the top sheet 12 is peeled from the otherwise intact envelope, giving full access to the contents of the pocket 17.

The actual composition of the two sheets and of their component layers may be varied to suit specific conditions as long as the afore-described relationship of breaking strengths and tear propagation resistances is maintained by suitably selecting the plastic materials and their dimensions. Breaking strength, bond strength, tear resistance and like terms, as employed in this specification and the attached claims, are actual properties of the sheets or layers, and not specific properties of the materials determined on standard specimens.

Thus, the outer layers may also be made of regenerated cellulose (viscose), polyester, polypropylene, or polyvinyl-chloride having greater breaking strength than the ethylene polymer layer 13 of the top sheet 12. Isotropic polyamide, such as unstretched Nylon 6, is preferred because it has adequate toughness and strength in even thin layers, is readily shaped, practically impervious to dry gases, and easily bonded adhesively to suitably prepared ethylene polymers. Polyethylene and copolymers of ethylene are preferred for the inner layers 11, 13 because of their ability of being heat-sealed or welded at relatively low temperatures, and of forming welded seams which are vacuum-tight, and because of their impermeability to moisture.

As will be evident from the above description of the events during opening of the envelope, it is essential that the breaking strength and tear propagation resistance of the inner layer 13 of the top sheet 12 be lower than the corresponding properties of the outer layer 14 and of the bond between the two layers which is not capable of pictorial representation on the scale of the instant drawing.

In addition to the high-pressure polyethylene mentioned above, suitable material for the relatively brittle inner layer 13 include high-pressure ethylene-butylene copolymer having a specific gravity of 0.928 to 0.940.

The ethylene polymer constituting the inner layer 11 of the bottom sheet 9 need only meet the requirement that it be tougher or less brittle than the inner layer 13. Preferred polymers include the afore-mentioned high-pressure polyethylene having a specific gravity of 0.918 to 0.924 or a high-pressure polyethylene having a specific gravity of 0.935 to 0.940. Because of the relatively low tensile strength of this latter material, it must be employed in suitable thickness to concentrate the peeling stresses in the desired manner described above. The last-mentioned material permits sterilization at temperatures as high as 130°C.

The best material for the cup-shaped, inner layer 11 among the many tested so far is a copolymer of ethylene and vinyl acetate containing 2 to 10 percent of the vinyl ester by weight. It is particularly tough and readily heat-sealed.

The tearing lugs 4 are located near the corners of the weld loop to ensure that the pocket 17 is opened over its full length and width. The spurs 6, 7 guide the incipient tear accordingly so that it is propagated along the inside of the weld 2 where the edge portion 3 and the central portion 1 are integrally joined in each sheet.

Figure 3:
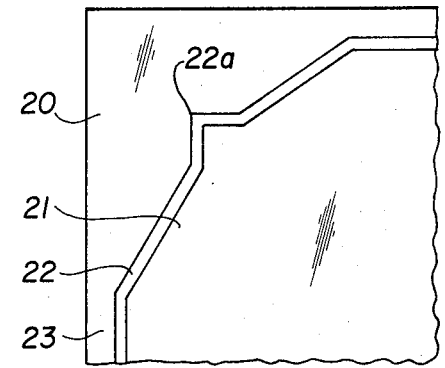
FIGS. 3 and 4 illustrate respective modifications of details in the envelope of FIG. 1 in enlaraged, fragmentary views.
Figure 4:
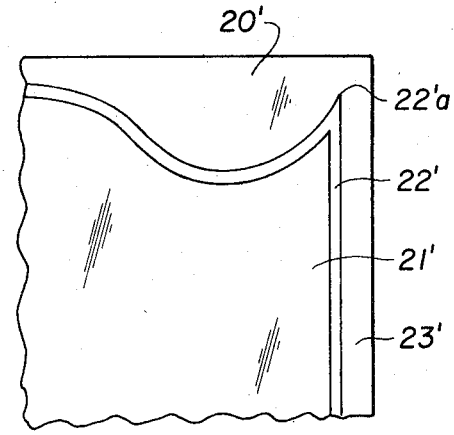

Modified shapes of elongated welds performing in an analogous manner are illustrated in FIGS. 3 and 4. The tear lugs 20 shown in FIG. 3 are respective corner portions of the generally rectangular two plastic sheets, and are wider than the remainder of the edge portions 23. The edge portion 23 and tear lugs 20 are separated from the central portions 21 of the two sheets by a weld 22 connecting the respective inner layers of the sheets in the manner described above with reference to FIG. 2. An integral longitudinal portion 22a of the weld 22 constitutes a spur generally extending from the closed loop of the weld 22 in a direction away from the pocket between the central portions 21 and toward the tear lugs 20.

In the envelope partly illustrated in FIG. 4, the otherwise generally rectangular weld 22' has a longitudinally portion adjacent one corner of the rectangle which is concavely arcuate so as to bound enlarged tearing lugs 20' of the edge portions 23' of the two plastic sheets. The portions of the weld 22' running along two adjacent sides of the rectangular central portions 21' of the superposed sheets meet in an acutely angular spur 22'a which is directed toward the tear lugs 20' and makes it much easier to start tearing the top sheet and peeling it from the bottom sheet along the inner side of the weld 22' as described above.

The spurs 6, 7, 22a, 22'a have the added advantage of preventing curling of the lug portions of the two superimposed plastic sheets. Curled edge portions may catch on rigid objects and cause the envelopes to be torn open prematurely.

The bond between the outer and inner layers of each sheet 9, 12 may be formed in any desired manner, but it is preferred to form a flat sheet of the material of each layer, and to bond the two layers by means of adhesive after suitable pretreatment if needed. This bonding method permits one of the contact faces to be printed upon, and the imprint to be visible through the transparent outer layer, yet protected against wear, and out of contact with the food or other contents of the envelope. Suitable heat resistance adhesives are staple articles of commerce.

By way of example, an outer layer of Nylon 6 having a thickness of 50 micron was coated with a commercial, two-component adhesive composition, and the adhesive was dried in a tunnel oven within 3 seconds at about 60°C. One surface of a 75 micron foil of ethylene-vinyl acetate copolymer (92 percent ethylene, 8 percent vinyl acetate) was activated by corona discharge and superimposed with pressure on the adhesive-coated Nylon surface. The laminar structure so obtained was vacuum-formed to provide the cup shape of the bottom sheet.

An analogous procedure was employed in preparing a top sheet from the same Nylon 6 and a 50 micron foil of high-pressure polyethylene of specific gravity 0.935 having a melt index of 3.0 g/10min, corresponding to DIN53735 (MFJ 190/2,16). The weld 2 between the top and bottom sheets was formed in a vacuum at about 150°C.

While specific shapes of plastic envelopes have been illustrated and specific materials of construction have been described, it will be appreciated that the invention does not reside in the configuration of the envelope, conventional in itself, and other combinations of materials showing the relationship of mechanical strengths may be selected by those skilled in the art without departing from the spirit and scope of the invention set forth in the appended claims.

What is claimed is:

1. A vacuum-tight envelope comprising:
   a. first and second laminar plastic sheets having each a central portion and an edge portion extending about the central portion in a closed loop;
   b. each sheet having an outer layer and an inner layer bonded to said outer layer;
   c. said central portions being spacedly superposed in such a manner that said inner layers of said central portions bound a pocket therebetween;
   d. said edge portions being contiguously superposed;
   e. an elongated weld integrally connecting said inner layers of said edge portions in a closed loop sealing said pocket;
   f. respective lug parts of said edge portions extending beyond said weld away from said pocket and being movable relative to each other;
   g. the breaking strength and tear propagation resistance of the outer layer of said first sheet being greater than the breaking strength and the tear propagation resistance of the inner layer of said first sheet;
   h. the inner layers of said first and second sheets consisting of ethylene polymers, the inner layer of said first sheet being more brittle than the inner layer of said second sheet;
   i. the strength of the bond between the inner and outer layers in said first sheet being smaller than the breaking strength of said weld.

2. An envelope as set forth in claim 1, wherein said outer layer of said first sheet consists of unstretched polyamide, and the ethylene polymer of the inner layer of said first sheet has a specific gravity of 0.928 to 0.940, and a melt index of 3 to 5 g/10min, corresponding to DIN35735 (MFJ 190/2,16)

3. An envelope as set forth in claim 2, wherein the inner layer of said second sheet consists of high-pressure polyethylene having a specific gravity of 0.918 to 0.924.

4. An envelope as set forth in claim 2, wherein the inner layer of said second sheet consists of high-pressure ethylene polymer having a specific gravity of 0.935 to 0.940.

5. An envelope as set forth in claim 1, wherein said weld includes a spur extending from said closed loop thereof in a direction away from said pocket and toward said lug parts.

6. An envelope as set forth in claim 1, wherein at least one longitudinal portion of said weld is of reduced width and more frangible than the remainder of said weld.

* * * * *